United States Patent [19]

Millsap

[11] 4,399,906

[45] Aug. 23, 1983

[54] TEMPERATURE EXPANSIVE SCREW CONVEYOR

[75] Inventor: Cecil E. Millsap, Burleson, Tex.

[73] Assignee: Thomas Conveyor Company, Inc., Fort Worth, Tex.

[21] Appl. No.: 227,253

[22] Filed: Jan. 22, 1981

[51] Int. Cl.³ ............................................ B65G 33/26
[52] U.S. Cl. .................................. 198/662; 198/676; 198/677; 432/154; 432/245; 110/110
[58] Field of Search .............. 198/662, 664, 676, 677; 432/139, 154, 239, 245, 251; 414/197; 110/110; 34/179, 182, 183; 165/87

[56] References Cited

U.S. PATENT DOCUMENTS 61,907 2/1867 Williams .............................. 198/677
1,775,888 9/1930 Christian ............................. 198/677

Primary Examiner—Joseph E. Valenza
Attorney, Agent, or Firm—Jerry W. Mills

[57] ABSTRACT

A screw conveyor (10) is disclosed for use in environments having a large range of temperature. The screw conveyor (10) includes a hollow shaft (12) having a number of aligned circular holes (18a, 18b) therein, with adjacent sets of holes being at right angles to each other. A stake (16) is slidably inserted in each set of holes (18a, 18b) for securing a helical flight (14a-e) to the shaft (12). Four stakes (16) are welded to the back (26) of each of the helical flights (14) along a helical line corresponding to the helical path defined by the flights (14). The slidable interaction of the stakes (16) with respect to the shaft (12) permits each flight (14) to move relative to the shaft (12) during expansion or contraction of the screw conveyor (10). The back peripheral edge (20) and front peripheral edge (22) of adjacent helical flights (14) are overlapping and movable with respect to each other to further accommodate the expansion and contraction of the screw conveyor (10).

14 Claims, 3 Drawing Figures

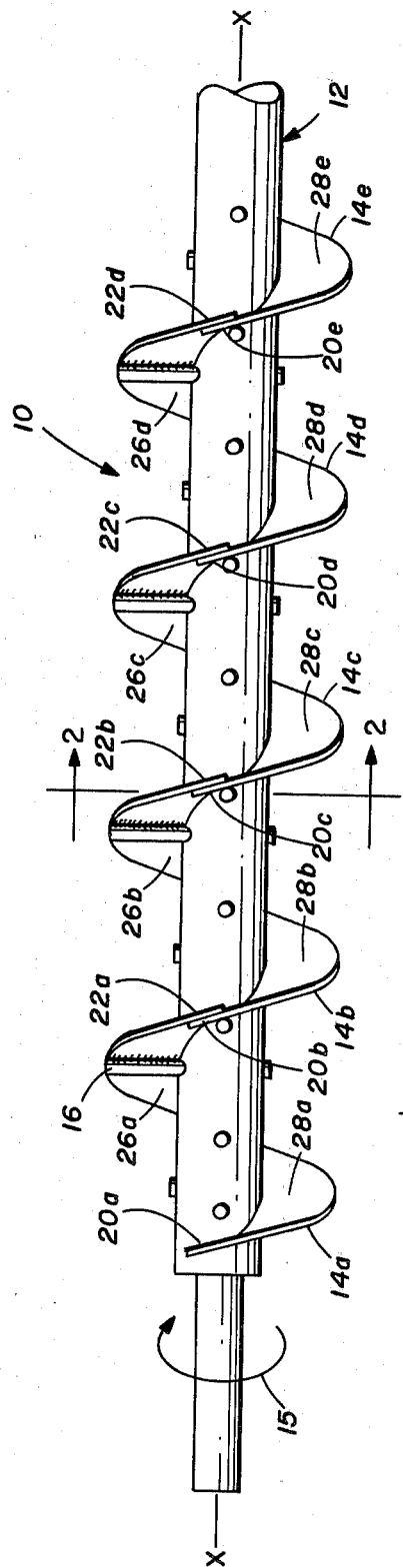
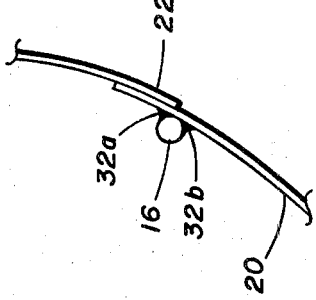
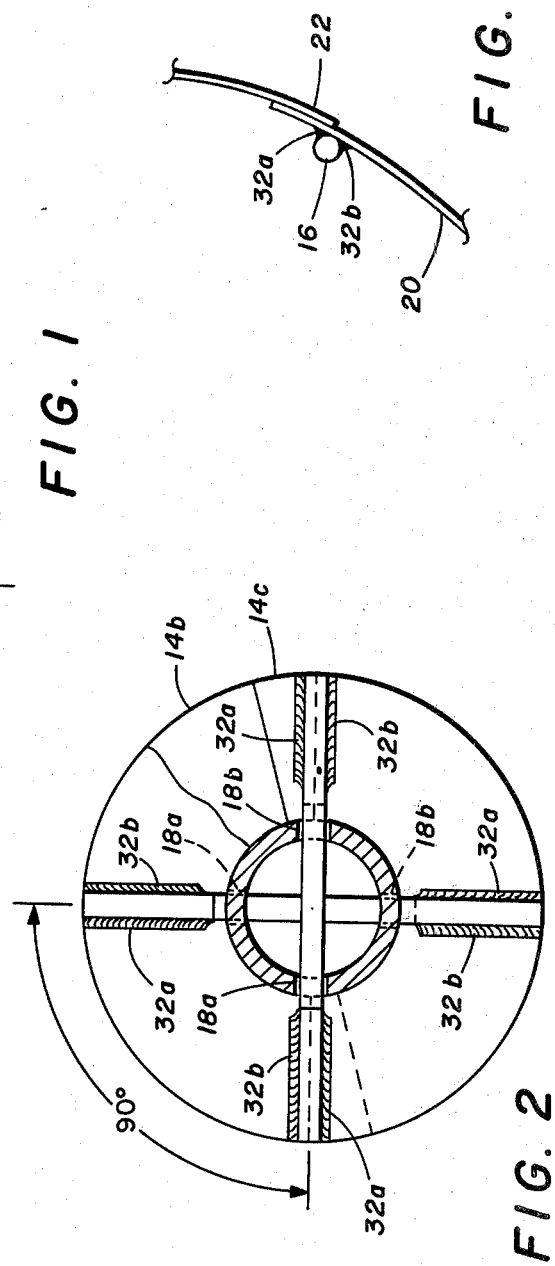

TEMPERATURE EXPANSIVE SCREW CONVEYOR

TECHNICAL FIELD

This invention relates to devices for conveying materials, and in particular to a screw conveyor.

BACKGROUND ART

Screw conveyors for transporting material have existed, in one form or another, for many centuries. A screw conveyor consists essentially for a central rotating shaft and a flight secured about the shaft along helical lines for transporting the material along the shaft when the shaft is rotated.

In modern applications, a screw conveyor may be constructed from separate pieces of metal welded together by many weld joints. While this construction is satisfactory for many applications, a screw conveyor including a large number of weld joints may be damaged if subjected to wide extremes of temperature.

In one application, screw conveyors have been subjected to a temperature range from ambient temperature when the screw conveyor is not in use, to a temperature of 1300 degrees Farenheit when transporting material. The continued expansion and contraction of the screw conveyor due to such an extreme temperature range has often caused breakage of the weld joints. It has been found that the typical screw conveyor will survive only one month of this temperature variation before repair is necessary.

DISCLOSURE OF THE INVENTION

In accordance with the present invention, a screw conveyor for conveying material is provided. The screw conveyor includes a shaft mounted for rotation about an axis, and having holes formed therein, each of the holes being positioned at a predetermined angle from the next adjacent hole. The screw conveyor further includes a plurality of stakes, each slidably inserted in the holes and extending generally outward from the shaft. At least one flight is positioned about a portion of the shaft for conveying material as the shaft is rotated about the axis, the flight being secured to selected ones of the stakes so that the flight and selected ones of the stakes may move relative to the shaft during expansion and contraction of the screw conveyor.

In accordance with another aspect of the present invention, a screw conveyor for conveying material is provided which comprises a shaft mounted for rotation about at axis, and a plurlity of flights positioned about the shaft to define a path for conveying the material as the shaft is rotated. The peripheral edges of adjacent flights are overlapping and movable with respect to one another to accomodate expansion and contraction of the screw conveyor.

BRIEF DESCRIPTION OF THE DRAWINGS

A more complete understanding of the invention may be had by reference to the following detailed description when taken in conjunction with the accompanying drawings, wherein:

FIG. 1 is a side view of a screw conveyor incorporating the features of the present invention;

FIG. 2 is a section view of the screw conveyor of FIG. 1 taken along Line 2—2 in FIG. 1 in the direction of the arrows;

FIG. 3 is a partial side view of the screw conveyor illustrating the overlap of adjacent flights.

DETAILED DESCRIPTION

Referring now to the drawings, wherein like reference characters designate like or corresponding parts throughout several views, FIG. 1 illustrates a screw conveyor 10 incorporating the features of the present invention. The screw conveyor 10 includes a central shaft 12, which may be mounted for rotation about the central axis X—X, and rotated by any suitable motor (not shown). A series of helical screw conveyor flights 14 a–e are mounted on the shaft 12 by a number of stakes 16 in a manner described hereinafter.

The series of flights 14 a–e define a helical path for moving material along the screw conveyor. The shaft 12 is rotated in the direction of arrow 15 to move the material along the screw conveyor 10 from left to right as shown in FIG. 1. The screw conveyor 10 will generally be placed within a trough or tunnel to maintain the material in contact with the flights 14 e–e.

A number of opposed circular holes 18a and 18b are formed along the length of shaft 12. Each pair of holes 18a and 18b are positioned at 90 degrees from the next adjacent pair of holes about the shaft 12, as best shown in FIGS. 1 and 2.

Circular stakes 16 are inserted through each pair of holes 18a and 18b with a substantial portion of the length of each stake 16 extending outwardly from one side of shaft 12 in a direction generally perpendicular to axis X—X. Stakes 16 are not secured to shaft 12 in any manner, but are allowed to move freely relative to shaft 12 along the longitudinal axis of the stake and rotate about the longitudinal axis. The exposed portions of stakes 16 define a helical path substantially equivalent to the helical path formed by flights 14 a–e.

The flights 14 a–e are formed in a helical shape to extend slightly more than one full revolution about shaft 12. The flights 14 a–e are then positioned about shaft 12 so that no portion of any flight contacts the outer surface of shaft 12, except for the back peripheral edge 20a of flight 14a, which is secured to shaft 12 in any convenient manner.

Each flight 14 is secured on the screw conveyor 10 by attachment to four stakes 16. Each stake 16 is secured in a suitable manner to the back side 26 a–e of each flight 14 a–e to secure the flight on the shaft 12 and to prevent interference with material being moved along the front surface 28 a–e of flights 14 a–e.

An important aspect of the present invention is the positioning of the flights about shaft 12 so that the forward peripheral edges 22 a–d of the flights overlap the back peripheral edges 20 b–e of the next adjacent flight 14. For example, the front peripheral edge 22a of flight 14a overlaps the back peripheral edge 20b of flight 14b. The overlapping peripheral edges are not secured to each other in any manner, but are permitted to slide and move relative to one another in order to accommodate expansion and compression of the screw conveyor 10 resulting from temperature differentials or material loading so that stress concentrations within the screw conveyor 10 are reduced to lessen the likelihood of failure in a component of the screw conveyor.

FIG. 2 illustrates a representative flight 14c and the four stakes 16 associated therewith. It can be readily observed from FIG. 2 that the stakes 16 extend outwardly from shaft 12 at right angles to the next adjacent stake and act to ensure common rotation of the flights 14 and shaft 12. The movement of material along shaft 12 during rotation of the shaft is thereby induced by contact with flights 14. However, the slidable insertion of each stake 16 within holes 18a and 18b permit the flights 14 and sakes 16 to move relative to shaft 12 during expansion and compression of the screw conveyor 10 to further reduce stress concentration in the screw conveyor.

In the preferred embodiment the shaft 10, flights 14 a-e and stakes 16 are formed of a weldable material, such as stainless steel as shown in FIGS. 2 and 3, each stake 16 may be secured to the back 26 of a flight 14 by use of welds 32a and 32b.

In construction of the preferred embodiment of screw conveyor 10, the flights 14 may be slid along shaft 12 and oriented in an overlapping position as shown in FIG. 1. Each stake 16 may then be inserted through the appropriate holes 18a and 18b in shaft 12, and then welded in one end to a flight. The welds 32a and 32b should terminate at a suitable distance from the holes 18a and 18b to permit free sliding of the stakes 16 within shaft 12. The peripheral edge 20a of flight 14a is welded to shaft 12 and forms the only weld between the flights or stakes and the shaft. For a central shaft 12 having an outer diameter of 5 inches and flights 14 having an outer diameter of 16 inches, a gap of 1 inch between the weld 32a and 32b and the outer surface of shaft 12 and has been found suitable.

In summary, the screw conveyor 10 of the present invention permits relative motion between adjacent flights 14 with slidable overlapping of peripheral edges and relative to the shaft 12 by means of the slidable shafts 16. This permits the present screw conveyor 10 to accommodate the expansion and contraction resulting from a temperature range, as for example, from ambient temperature to 1300 degrees Farenheit, without substantial risk of harm due to failure of rigid weld joints between the flights and the central shaft, while retaining its full efficiency as a conveyor for conveying materials.

Although a single embodiment of the invention has been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. A screw conveyor for conveying material comprising:
    shaft means mounted for rotation about an axis and having holes formed therein, each of said holes being positioned at a predetermined angle from the next adjacent hole;
    a plurality of stake means slidably inserted in said holes and extending generally outward from said shaft means;
    a plurality of adjacent flights having a trailing edge and a leading edge with a continuous helical contour therebetween positioned about a portion of said shaft means for conveying material as said shaft means is rotated, the trailing edge of each of said flights slideably overlapping the leading edge of the adjacent one of said flights, each of said flights secured to selected ones of said stake means so that each of said flights and said selected ones of said stake means can move relative to said shaft means during expansion and contraction of the screw conveyor.

2. The screw conveyor of claim 1 wherein said holes in said shaft means are circular and each of said stake means is circular in cross section to permit rotation of said stake means relative to said holes.

3. The screw conveyor of claim 1 wherein the leading edge of each of said flights nearest the point of entry of the material to be conveyed is secured to said shaft means.

4. The screw conveyor of claim 1 wherein each of said flight means is secured to four stake means, each of said stake means extending at right angles to the next adjacent stake means.

5. A screw conveyor for conveying material comprising:
    an elongate central shaft mounted for rotation about an axis having holes formed therein, each of said holes being positioned at essentially ninety degrees from the next adjacent hole;
    a plurality of stakes slidably inserted in said holes and extending outwardly from said shaft;
    a plurality of adjacent flights having a trailing edge and a leading edge with a continuous helical contour therebetween positioned about a portion of said central shaft for conveying material as said central shaft is rotated, the trailing edge of each of said flights slideably overlapping the leading edge of the adjacent one of said flights, each of said flights secured to selected ones of said stakes with one of said stakes disposed proximate the surface of the leading edge of an associated one of said flights to support both the leading edge of the associated one of said flights and the overlapping edge of the adjacent one of said flights, the overlapping of said flights accomodating the relative movement between each of said flights, and said central shaft during expansion and contraction of said screw conveyor.

6. The screw conveyor of claim 5 wherein each of said holes in said central shaft is circular and each of said stakes is circular in cross section to permit rotation of said stakes relative to said holes, the cross section of said stake means smaller than said holes for rotation therein.

7. The screw conveyor of claim 5 wherein said flights and said stakes are formed from a weldable material and said selected ones of said stakes are secured to said flight by welding.

8. The screw conveyor of claim 5 wherein said selected ones of said stakes includes four stakes positioned at right angles to each other along a path substantially equivalent to the path defined by each of said flights, one of the four stakes associated with a particular one of said flights attached to the peripheral edge of said flight nearest the point of entry of the material to be conveyed.

9. A screw conveyor for conveying material comprising:
    an elongate central shaft mounted for rotation about its elongate axis and having a plurality of holes formed therethrough generally perpendicular to the axes of rotation, each of said holes being positioned along said central shaft at right angles to the next adjacent hole;
    a plurality of stakes slidably inserted in said holes and extending outwardly from said central shaft perpendicular to the axis of rotation;

a plurality of adjacent helical flights having a leading edge and a trailing edge with a continuous helical contour therebetween for conveying material along said central shaft as said central shaft is rotated, each of said flights being positioned about a portion of said central shaft and dimensioned to circumvent said central shaft more than one revolution thereof, each of said flights secured to selected ones of said stakes with one of said stakes disposed proximate the surface of the leading edge of an associated one of said flights to support both the leading edge of the associated one of said flights and the overlapping edge of the adjacent one of said flights, adjacent ones of said flights slidable overlapping so that the expansion and contraction of the screw conveyor is accommodated by the relative motion of each of said flights and said selected ones of said stakes relative to said central shaft, each of said flights substantially retaining said stakes in said holes and said stakes substantially retaining rotational motion of each of said flights about said shaft.

10. The screw conveyor of claim 9 wherein said holes in said central shaft are circular and said stakes are circular in cross section and smaller than said holes to permit location of said stakes relative to said holes.

11. The screw conveyor of claim 9 wherein said selected ones of said stakes securing associated ones of said helical flights are positioned on the back side of said flights to prevent interference with the material being moved.

12. The screw conveyor of claim 9 wherein said helical flights and said stakes are formed from weldable materials and said selected ones of said stakes securing said helical flight are welded thereto.

13. The screw conveyor of claim 9 wherein said selected ones of said stakes include four stakes positioned at right angles relative to the next adjacent stake and one of said selected stakes secured to the peripheral edge of the associated one of said flights nearest the point of entry of the material to be conveyed.

14. A screw conveyor for conveying material comprising:

shaft means mounted for rotation about an axis and having holes formed therein, each of said holes being positioned at a predetermined angle from the next adjacent hole;

a plurality of stake means slideably inserted in said holes and extending generally outward from said shaft means;

a plurality of flights having a helical contour positioned about a portion of said shaft means for conveying material as said shaft means is rotated, the trailing edge of each of said flights slidably overlapping the leading edge of the adjacent one of said flights, each of said flights secured to selected ones of said stake means with one of said stake means disposed proximate the surface of the leading edge of an associated one of said flights to support both the leading edge of the associated one of said flights and the overlapping edge of the adjacent one of said flights so that said flights and said selected ones of said stake means can move relative to said shaft means during expansion and contraction of the screw conveyor.

* * * * *